S. C. COBB.
Harrow-Tooth Attachment.

No. 224,274. Patented Feb. 10, 1880.

Witnesses
W. C. Corlies
Jno. C. MacGregor

INVENTOR
Samuel C. Cobb
By [signature]
Attorneys

UNITED STATES PATENT OFFICE.

SAMUEL C. COBB, OF JANESVILLE, WISCONSIN, ASSIGNOR TO JAMES B. CROSBY, OF SAME PLACE.

HARROW-TOOTH ATTACHMENT.

SPECIFICATION forming part of Letters Patent No. 224,274, dated February 10, 1880.

Application filed December 21, 1878.

*To all whom it may concern:*

Be it known that I, SAMUEL C. COBB, of Janesville, in the county of Rock and State of Wisconsin, have invented a new and useful Improvement in Harrow-Tooth Attachments, which is fully described in the following specification, reference being had to the accompanying drawings, in which—

Figure 1:
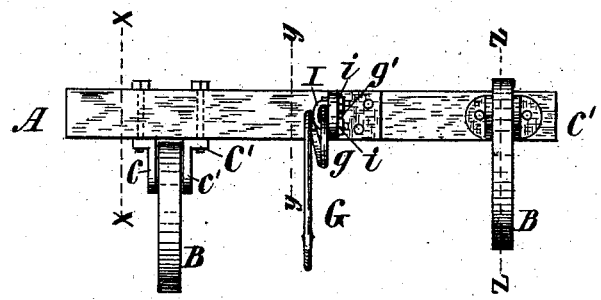
Figure 2:
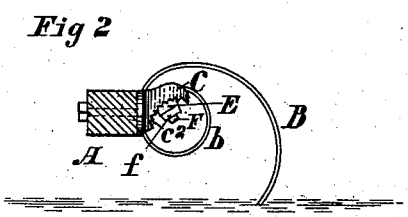
Figure 3:
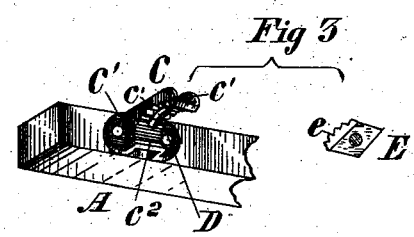
Figure 4:
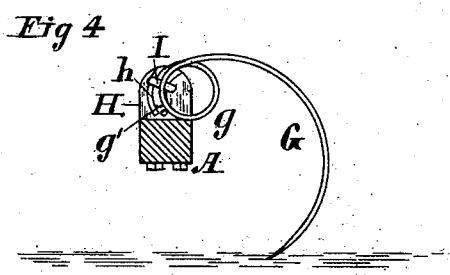
Figure 5:
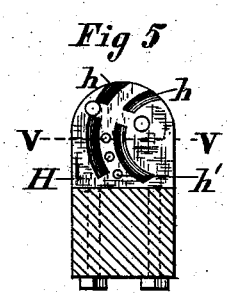
Figure 6:
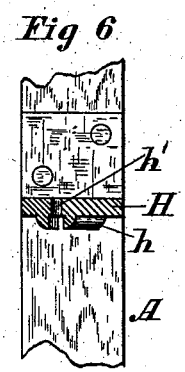
Figure 7:
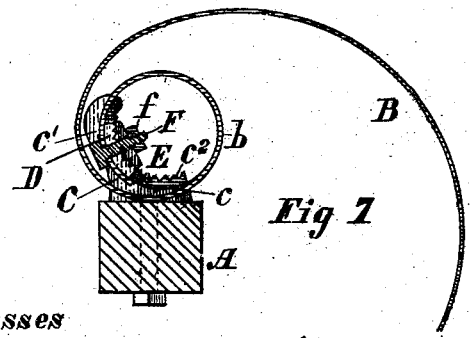

Figure 1 represents a plan view of a single tooth-bar of a harrow with tooth-holder attachments embodying my invention; Fig. 2, a transverse section of the same, taken on the line $x\ x$, Fig. 1; Fig. 3, a perspective view of one form of bracket tooth-holder; Fig. 4, a transverse section taken on the line $y\ y$, Fig. 1, showing a modified construction of the tooth-holder; Fig. 5, an enlarged view of the same with the tooth removed; Fig. 6, a sectional plan view of the same, taken on the line $v\ v$, Fig. 5; Fig. 7, a transverse section, on an enlarged scale, taken on the line $z\ z$, Fig. 1; and Figs. 8 and 9, sectional and perspective views, showing a modification in the construction of the flat-tooth bracket.

My invention relates especially to harrows in which elastic teeth are used; and its object is to provide a bracket for attaching the teeth to the bar, to which the teeth are secured in such a manner as to be adjustable in the direction of their length.

The invention consists in a bracket provided with a curved seat for the bent upper end of the tooth, in combination with devices for securing the tooth thereto which permit the curved end of the tooth to be moved along and around said seat for adjusting the height and pitch of the lower end of the tooth.

It also consists in special devices and combinations, all of which will be hereinafter described in full, and definitely pointed out in the claims.

In the drawings, A represents one bar of a harrow, to which the teeth are attached; and B, flat elastic teeth, having a coil, $b$, at their upper ends. These teeth are secured to the bar A by means of a bracket, C, which is provided with a curved surface or seat, $c$, extending underneath and up at one side of the bracket, as shown in Fig. 7 of the drawings, and is adapted to receive the coiled end of the tooth and constitute a seat therefor.

On each side of the curved seat are flanges $c'$, between which the end of the tooth is held, and at the lower portion of the bracket ears or lugs $C'$ are provided, by means of which the bracket is fastened to the bar by suitable bolts and nuts. A longitudinal slot, D, is cut in the curved seat $c$, and the back or concave portion of the seat is provided with serrations $c^2$.

A washer, E, is constructed with one face convex, which is adapted to fit the concave portion of the bracket, and is provided with serrations $e$, similar to those on the bracket. This washer is pierced for the reception of a bolt, F, and the tooth is fastened to the bracket by means of this bolt, which passes through a hole in the end of the tooth, the slot in the bracket, and the washer E, and is secured by a nut, $f$, on the outside of the washer.

It is evident that the serrations on the convex face of the washer will engage with the serrations on the concave surface of the bracket, as shown in Fig. 7 of the drawings, and will thereby hold the teeth firmly in position when the nut is tightened on the bolt; but at the same time the tooth may be adjusted longitudinally on its seat by loosening the nut sufficiently to permit the washer to be disengaged from the bracket, when the coil of the tooth may be set around on the seat of the bracket in either direction, the bolt moving in the slot D to accommodate the change in the position of the tooth. The pitch of the tooth may thus be adjusted, as well as the height of the bar from the ground, and when the proper position is obtained the tooth is again secured by simply turning up the nut $f$ on the bolt.

Figure 8:
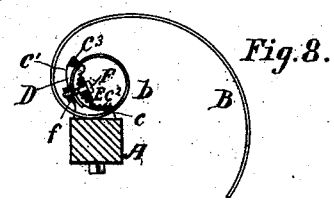
Figure 9:
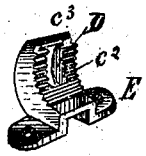

The flat-tooth bracket C may be modified in construction, as shown in Fig. 9 of the drawings, in which the cross-bar or rest $c^3$, at the upper end of the bracket, is arranged in front of the tooth, so that the latter has a support on both sides and the strain is taken off from the tooth when the bolt is inserted, which is reversed in position, as shown in Fig. 8 of the drawings.

The bracket may be fastened either to the top or side of the bar, both positions being shown in the drawings, though I prefer the former.

If a round or square tooth is preferred instead of a flat one, the construction of the attachment may be modified slightly to adapt it to this form of tooth. In Figs. 1 and 4 of the drawings, G represents a tooth of this form, the upper end of which is provided with a coil, $g$, as in the flat tooth, except that it is wound a little spirally, so as to bring the extremity a little to one side.

The bracket H has an upright portion standing directly across the bar, and on one side of the upright portion are circular ribs $h$, arranged a slight distance apart, so as to receive the extreme end of the tooth-coil between them, thereby forming a curved seat for the tooth.

A series of holes, $h'$, are made in the upright portion of the bracket between the ribs $h$, their arrangement, consequently, being circular, and at the upper end of the tooth a short portion is bent outward at right angles, to form a projecting pin, $g'$, adapted to enter any one of the holes $h'$. The tooth is placed in position by arranging the outer portion of the coil between the flanges $h$ and inserting the projecting pin $g'$ in one of the holes in the bracket, in which position it is secured by means of a staple, I, which embraces the tooth, and is drawn up tightly to hold it in position by means of nuts $i$, turned upon the ends of the staple on the other side of the bracket, which is pierced to permit them to pass through, as shown in Fig. 5 of the drawings. If desired, the ribs $h$ may be cut away where the staple crosses them, as shown in the same figure, thereby permitting the staple to clasp the tooth tightly.

When it is desired to adjust the tooth the nuts on the staple are loosened sufficiently to permit the projection $g$ on the tooth to be withdrawn from the bracket, when the tooth may be turned in its seat in either direction, and again fastened in position as above described, thereby affecting the lower end of the tooth in precisely the same manner as in the adjustment of the flat tooth on its bracket.

It will be seen, therefore, that the same principle of construction and adjustment is carried out in each of the brackets, the modification in form in the latter case being simply such as will adapt the bracket to the use of a round or square tooth. This adaptation may be effected in some other way—such, for instance, in making the bracket hollow so far as to provide a curved socket for the tooth, which might be fastened therein by a set-screw; but I prefer the construction herein described on account of its simplicity and cheapness.

Some modification may be made in the first form of bracket and the special devices described for securing the tooth thereto; and hence I do not limit my improvement to the specific devices described and shown, provided the principle of attachment and adjustment of the tooth is retained.

Having thus described my invention, what I claim, and desire to secure by Letters Patent, is—

1. In an elastic-tooth harrow, a tooth-bar, A, in combination with a bracket provided with a circular seat to receive the tooth, an elastic tooth curved or coiled at its upper end to fit the bracket-seat, around which it may be moved, and a fastening device for rigidly securing the tooth in any position to which it may be adjusted, whereby the tooth may be readily adjusted in the direction of its length by turning it around its seat and fixed in its adjustment, substantially as described.

2. The tooth-bar, in combination with a flat elastic tooth, B, coiled at its upper end, the bracket C, mounted on the bar and provided with a convex seat, $c$, for the tooth, having a longitudinal slot, D, therein, and a fastening-bolt, F, whereby the tooth may be adjusted by turning it around its seat and secured in its adjusted position, substantially as and for the purpose set forth.

3. The tooth-bracket C, provided with a circular seat, $c$, having serrations $c^2$ on its opposite side, and a longitudinal slot, D, therein, in combination with the fastening-bolt F and a washer, G, having a convex serrated face fitting the serrated surface of the bracket, substantially as and for the purpose set forth.

4. The tooth-bracket C, constructed substantially as described, and provided with cross-bar or stop $c^3$ at its upper end, in combination with the coiled tooth arranged with reference to the stop as shown in Fig. 9, whereby the strain on the tooth at the point of attachment is relieved, substantially as described.

SAMUEL C. COBB.

Witnesses:
L. L. ROBINSON,
W. A. WEBSTER.